Aug. 29, 1939. C. P. GRIFFITH Re. 21,186.

AIR RELEASE MECHANISM FOR DISPENSING APPARATUS

Original Filed Aug. 27, 1928 2 Sheets-Sheet 1

Inventor:
Clement P. Griffith
By Cheever, Cox & Moore
Attys.

Aug. 29, 1939. C. P. GRIFFITH Re. 21,186

AIR RELEASE MECHANISM FOR DISPENSING APPARATUS

Original Filed Aug. 27, 1928 2 Sheets-Sheet 2

Inventor:
Clement P. Griffith
By Cheever, Cox & Moore
Attys.

Reissued Aug. 29, 1939

Re. 21,186

UNITED STATES PATENT OFFICE 21,186

AIR RELEASE MECHANISM FOR DISPENSING APPARATUS

Clement P. Griffith, Fort Wayne, Ind., assignor to S. F. Bowser & Company, Incorporated, Fort Wayne, Ind., a corporation of Indiana Original No. 2,044,727, dated June 16, 1936, Serial No. 580,143, December 10, 1931, which is a continuation of Serial No. 302,195, August 27, 1928. Application for reissue July 1, 1939, Serial No. 282,501

20 Claims. (Cl. 221—95)

My invention relates to air release mechanism, particularly adapted for use in connection with apparatus for dispensing gasoline, although it may have a general application.

One of its objects is the provision of improved and efficient means for releasing air from a gasoline supply line and combining such air release mechanism with an automatic operating valve for cutting off the flow of gasoline until the air has been released in the gasoline line.

Another object of my invention is to protect the meter against the measurement of air which may come from either leaks in the pipe line, or when the gasoline or other liquid in the container has been exhausted.

Still another object of my invention resides in the provision of an air release mechanism for a liquid dispensing system of the type wherein liquid is constantly forced through a displacement type of meter mechanism to operate the same and through the dispensing line when the valve-controlled nozzle therefor is open, and wherein an air separator is inserted in the liquid flow line in advance of the meter, the air separator including a restricted combined air and liquid discharge port which because of its restricted cross section causes the main volume of liquid to pass to the meter while permitting air to pass freely therethrough at all times and permitting only a restricted but constantly flowing stream of liquid to pass therethrough during the dispensing operation, and wherein additional separating means connected to this restricted port is provided for separating the air and liquid passing through said restricted port, said separating means including a portion constantly open to the atmosphere to discharge the separated air to atmosphere and including a recovery line for constantly returning the recovered liquid back to the system, the recovery line including means for preventing air from the atmosphere passing to the recovery line during the dispensing operation.

Another object of the invention is the provision of a combined air release and shut-off valve mechanism for effecting the release of air from a liquid supply line and cutting off liquid flow therein until the air has been released.

A further object of the invention is the provision of a combined air release and shut-off valve mechanism for preventing air from reaching the meter in the liquid supply line.

A further object of the invention is the provision of an improved and efficient pilot valve connected to a main valve combined with means for initially opening the pilot valve to equalize the pressure on both sides of the main valve and thereby facilitate the opening of such main valve.

One of the objects of my present invention is the provision of an air release placed at an elevation above the sight discharge and the meter whereby to keep them in proper timed condition at all times.

Other objects of the invention will appear hereinafter, the novel features and combinations being set forth in the appended claims.

In the accompanying drawings—

Figures 1, 2:
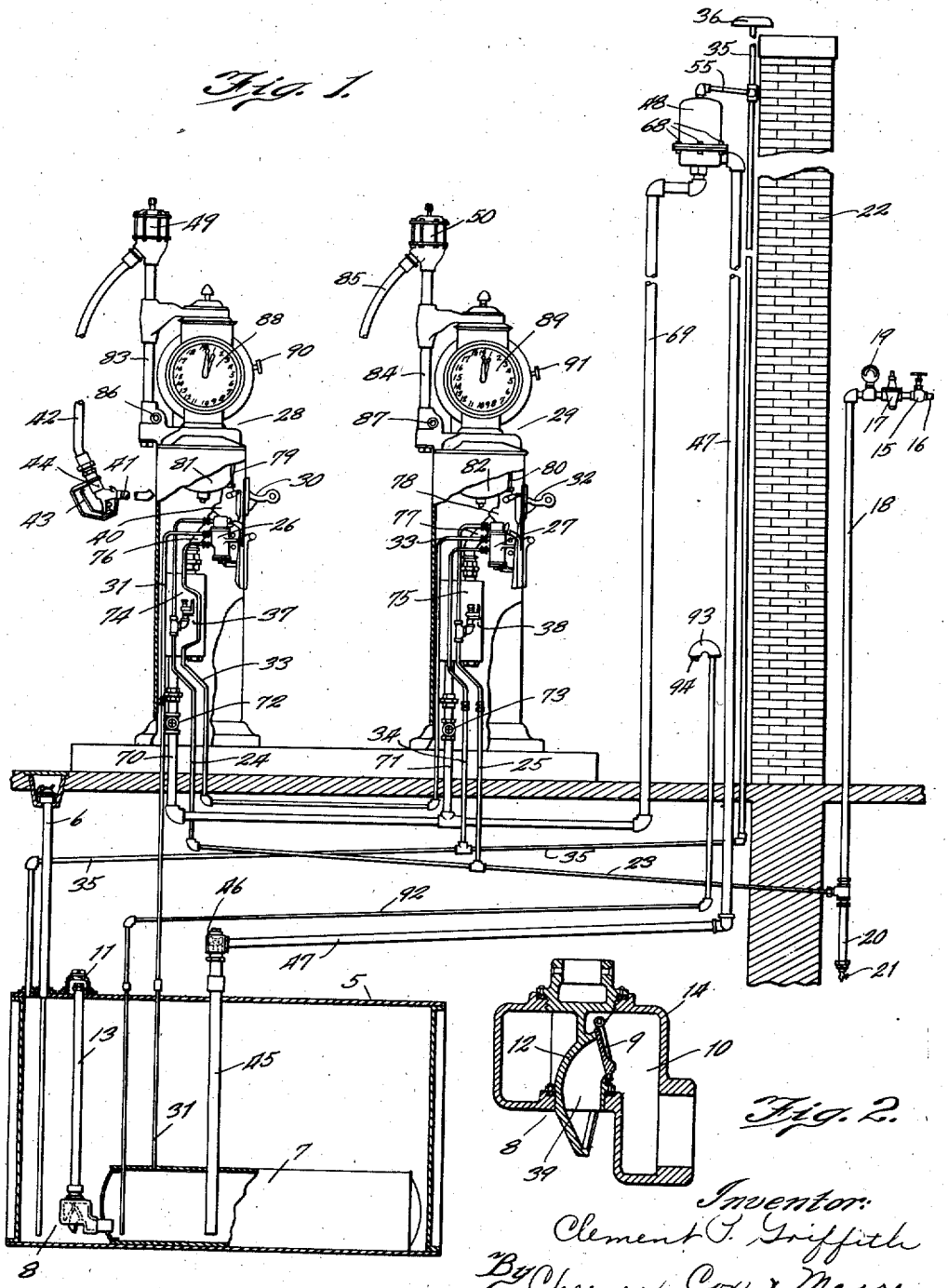
Fig. 1 illustrates a system of dispersing apparatus embodying my improvements.
Fig. 2 is a sectional elevation of the check-valve for controlling the supply of gasoline to liquid holding tank.

The air release mechanism herein disclosed functions equally as well when the liquid in the dispensing system is circulated by either a compressed air system, as shown in Fig. 1, or when supplied by any other type of pumping mechanism desired. In the present instance I have shown the liquid circulating means as comprising a compressed air system.

Referring to Fig. 1 showing the adaptation of my combined air release and shut-off mechanism to air pressure operated dispensing apparatus, 5 designates a tank which is adapted to be buried in the ground and it may be filled by means of the fill-pipe 6 with gasoline or other liquid which is to be dispensed and into which also flows the recovered liquid during the dispensing operation. Preferably within the larger storage tank 5 and at the bottom thereof is a relatively smaller storage tank 7 from which the liquid to be dispensed is caused to pass through a liquid flow line to the dispensing apparatus, and in the present instance by air pressure delivered on top of the liquid contained within this tank 7 as hereinafter explained. When the pressure in the tank 7 is relieved, gasoline in the main supply tank 5 may flow by gravity through the check-valve device 8 into the smaller tank 7.

In Fig. 2, I have illustrated the details of the construction of the check-valve device 8. The valve element 9 opens toward the chamber 10 but prevents backflow of the liquid from the smaller tank 7 into the tank 5 when air pressure is introduced into the tank 7. When the cap 11 is removed the valve body 12 may be lifted out of the larger tank 5 by means of the rod 13 after the valve body 12 is unscrewed from the valve casing 14. After the valve element 9 and its seat are cleaned or re-ground it may be replaced by means of the rod 13 and the cap 11 be replaced, as shown in Fig. 1.

A globe valve 15 controls the supply of air pressure which may be a receiving tank (not shown) to which the pipe 16 is connected. Adjacent the globe valve 15 may be located an air pressure reducing valve 17 which may be set for an air pressure of approximately ten pounds per square inch in the supply pipe 18. The pressure gauge 19 may be located in the supply 18 so as to be at the left of the air pressure reducing valve 17 shown in Fig. 1. At the bottom of the pipe 18 at a relatively low position is a water trap 20 with a petcock 21 at its lower end for the purpose of removing the accumulated water. The water trap 20 and the air pressure reducing valve 17 are preferably located inside of the building, a wall of which is shown at 22, so that accumulated water cannot freeze. The apparatus shown to the left of the wall 22 may be outside of the building.

Connected to the pipe 18 above the water trap 20 is a pipe 23 to which are connected the branch pipes 24 and 25 which lead upwardly to the uppermost connections of the controlling valve mechanisms 26 and 27 of the dispensing units 28 and 29, respectively. When the operating lever 30 of the dispensing unit 28 is moved upwardly the valve 26 is operated to connect the source of air pressure supply to the pipe 31 which is connected to the top of the tank 7. In the same manner, when the operating lever 32 of the dispensing unit 29 is moved upwardly the source of air pressure supply is connected to the pipe 33 and through certain ports in the valve 26 to the pipe 31. When the operating levers 30 and 32 are moved down to their horizontal positions shown in Fig. 1, the pipe 31 is connected through the valve mechanisms 26 and 27 to the pipe 34 which is connected to the vent pipe 35 leading from the top of the larger tank 5 to the air vent protector 36. Safety or air pressure relief devices 37 and 38 may be placed so as to relieve the pressure in the pipes 24 and 25 when pressure exceeds the set predetermined limit, for instance, fifteen pounds per square inch.

From the foregoing description it will be seen that by operating either of the levers 30 or 32 of the dispensing units, air pressure may be introduced into the top of tank 7 above the supply of liquid therein and when this occurs the valve element 9 shown in Fig. 2 will be automatically closed. When both levers 30 and 32 are in their horizontal positions the pressure in the tank 7 will be relieved, because the pipe 31 will be connected through the valve mechanisms 26 and 27 to the pipe 35 which is vented to the atmosphere.

When this relief of pressure in the top of tank 7 occurs the gasoline in the tank 5 will flow by gravity through the passageway 39 into the chamber 10 as shown in Fig. 2, thus replenishing the supply of gasoline in the tank 7.

When the operating lever 30 is moved upwardly the valve 40 in the gasoline supply line will be opened and the air pressure on the liquid in the tank 7 will then cause the gasoline to flow from the tank 7 to the nozzle 41 connected to the end of the hose 42, provided the lever 43 is actuated by the operator to open the valve located at 44 between the hose 42 and the nozzle 41. Flow through the gasoline line will be upwardly through the pipe 45 and the line valve 46 to the pipe 47. The line valve 46 is a check-valve which opens upwardly from the pipe 45 toward the pipe 47 and prevents backflow from the pipe 47 to the pipe 45. The flow of gasoline continues upwardly along the pipe 47 to the air release 48 which is preferably located above the sight discharges 49 and 50 of the dispensing units 28 and 29 whereby to keep them constantly primed with gasoline or other liquid. The pipe 47 is connected to the port 51 of the casing 52 of the air release device 48. The gasoline flowing into the port 51 strikes against the semi-circular baffle plate 53 so as to direct upwardly any air entrapped in the pipe 47.

The top of the casing 52 is provided with a constantly open but restricted vent opening 54 which is connected by air and liquid separating means comprising the downwardly slanting pipe 55 to the air or liquid separating means or stand pipe 35. It will be understood that whenever gasoline or other liquid is forced through the inlet 51 through casing 52 through outlet 64 thereof to the meter, it will flow in the divergent path in a relatively small stream through the restricted vent 54, the downwardly inclined pipe 55 to stand pipe 35 and thence backwardly through the recovery line to the liquid containing tank 5. During the dispensing operation it will be noted that the air from the atmosphere cannot pass in through valve ports 9 and 10, together with the gasoline passing therethrough into tank 7 because of the liquid seal between the lower end of pipe 35 and the entrance to the liquid supply tank 7. This liquid seal is formed by the liquid contained in tank 5 thus forming effective means preventing atmospheric air reaching the supply line during dispensing. It will also be apparent that the stand pipe 35 and particularly in connection with downwardly slanting pipe 55 forms an effective means connected to the restricted orifice 54 for permitting air and liquid discharging through port 54 to separate, the air upon separating passing upwardly through the outlet 36 while the liquid passes downwardly by gravity through the recovery line 35. When the tanks 5 and 7 become nearly exhausted of gasoline, air enters the pipes 45 and 47 and therefore when the storage tank is refilled with gasoline and the gasoline in the pressure tank is replenished, the initial upward flow of the gasoline from tank 7 through the pipes 45 and 47 will force the air in the latter into the air release casing 52 and this air will escape through the restricted vent 54 of the pipe 55 into the pipe 35. When sufficient gasoline enters the casing 52, the float 56 therein will be lifted to cause the rod 57 at the bottom of the float to lift the pilot valve 58 off its seat to open the port 59 at the center of the main valve 60. To the bottom of the pilot valve 58 is connected a stem 61 which is guided through a central bearing in the main valve 60 and through the fixed bearing 62 at the center of a spider connected to the bottom of the valve casing 52. The port 59 may also be in the form of openings through a spider which is connected to the main valve 60 and at the same time serves as a sliding bearing for the stem 61. When the pilot valve 58 is lifted by the float 56, a flexible joint at 63 will permit free vertical movement of the stem 61. When the pilot valve 58 opens the port 59 the liquid flowing in the casing 52 through the port 59 toward the port 64 will equalize the pressure of the liquid above and below the main valve 60. This equalization of the pressure above and below the valve 60 will permit the cross-pin 65 to easily lift the main valve 60 off its seat and establish direct communication between the casing 52 and relatively large port 64.

It will thus be seen that while the air is being released from the pipe 47 through the constantly open but restricted vent 54 the valves 58 and 60 will be held closed by the weight of the float 56, but when sufficient liquid enters the chamber of the casing 52 to cause the float to rise, the pilot valve 58 will first be opened and subsequently the main valve 60 so that gasoline or other liquid will flow simultaneously through the port 64 to the meter and also through the constantly open, restricted port 64 to pipe 55 to pipe 35 to tank 5. Limit stops 66 may be located on the inner walls of the casing 52 to limit the upward movement of the float 56 so that the latter will not close the vent 54. When desired, the screw-threaded plug 67 may be removed to permit drainage of accumulated sediment at the bottom of the casing 52. The casing 52 is preferably made in two sections detachably connected together by means of the bolts 68 so that when desired, access may be had to the valves for cleaning and regrinding.

When the main valve 60 is fully open the gasoline is free to flow into the pipe 69 and thence upwardly through the branch pipes 70 and 71. Hand-operated globe valves 72 and 73 control the upward flow of the gasoline from the pipes 70 and 71 to the screen filter devices 74 and 75. The gasoline continues upwardly through the pipes 76 and 77 to the valves 40 and 78, respectively. The pipes 79 and 80 lead upwardly from the valves 40 and 78 to the meters 81 and 82 which may be of the type shown in the Blum Patent No. 1,423,597, granted July 25, 1922, for an improvement in meters.

After passing through the meters 81 and 82 the gasoline continues upwardly through the stand-pipes 83 and 84 to the sight discharges 49 and 50 and thence to the hoses 42 and 85. The free ends of the hose may be connected to a valve controlled nozzle such as shown at the left-hand side of the dispensing unit 85 in Fig. 1. This is the wet hose system, but a dry hose system may be used, in which event it is preferred to provide at 86 and 87 manually operated valves.

The dispensing units 28 and 29 may be of that type having pointer and dial mechanism 88 and 89 operated by the meters 81 and 82 with mechanism for re-setting the pointers to zero by means of the knobs 90 and 91.

Extending to the bottom of tank 7 is a pipe 92, the upper end of which is provided with a vent 93 closed by a plug 94. When this plug is removed so as to vent the pipe 92 to the atmosphere, air under pressure introduced into the tank 7 through the pipe 31 will be effective in cleaning out the accumulated sediment in the bottom of the tank 7. To effect this cleaning operation the valve 15 may first be closed, the plug 94 then removed, and the valve 15 then slowly opened while one of the levers 30 or 32 is in its upper position.

Figure 3:
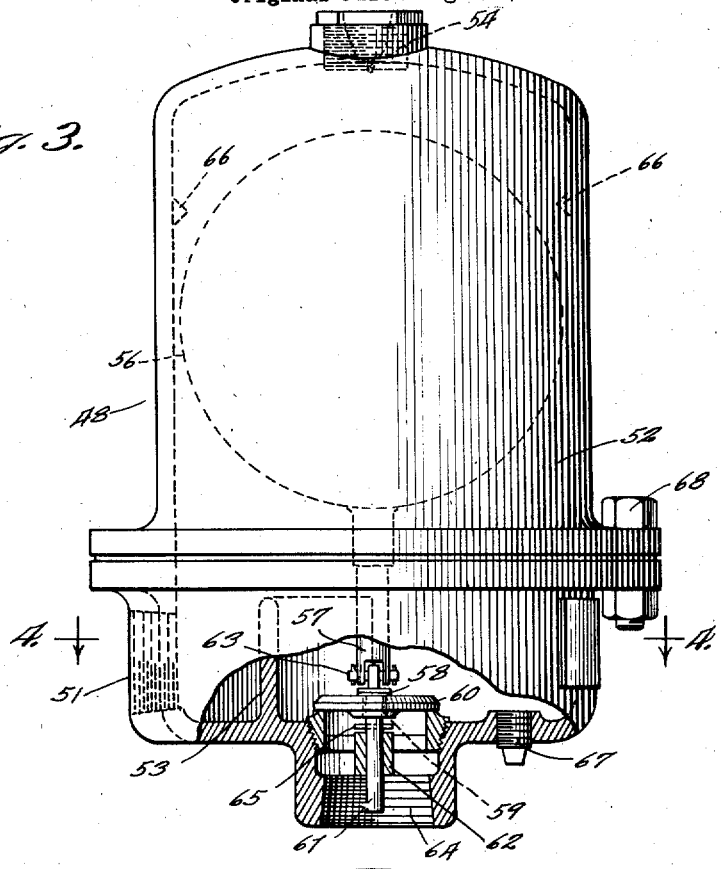
Fig. 3 is an elevational view, partly in section, showing the details of my combined air release and shut-off valve mechanism.
Figure 4:
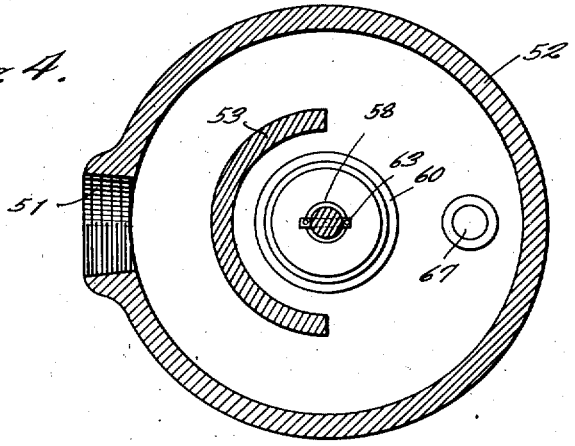
Fig. 4 is a sectional plan view taken on the line 4—4 of Fig. 3.

It should be noted that an important function of the air release and shut-off valve mechanism shown in Fig. 3 is to prevent the passage of air to either meter 81 or 82 if the delivery of the gasoline through either or both of the dispensing units 28 and 29 is of sufficient quantity to exhaust the gasoline in the auxiliary tank 7 before it is replenished with gasoline. If such continuous operation of either or both of the dispensing units should take place the device 48 acts automatically to effect a closure of the gasoline line by the closure of the valves 58 and 60, thereby preventing the flow of air into the meters 81 and 82 which may be sufficiently sensitive to cause the air to operate them if air were permitted to pass through them.

It can readily be seen by referring to Fig. 1 that if the connection to the tank 7 from the source of air pressure supply continues after the tank 7 has insufficient gasoline therein to cause flow thereof into the pipe 45, the air will flow through the latter and be vented by the device 48 to the atmosphere. I have above pointed out the manner in which air is removed when entrapped in the pipes 45 and 47 after the tank 7 is substantially empty of gasoline and the pressure from the source of air pressure supply is cut off.

It should also be understood that the total area of the pilot valve 58 combined with the main valve 60 is sufficient to enable the pressure which builds up the inside of the air release to hold these valves closed. The float is such that it does not possess sufficient buoyancy to lift both valves directly off their seats if they are connected together as one valve controlling the port 64. The float 56 does have sufficient buoyancy, however, to lift the pilot valve 58 off its seat to permit the gasoline to flow through the passageway 59 to equalize the pressure above and below the main valve 60. The float 56 then has sufficient buoyancy to carry upwardly both of the valves 58 and 60 when the cross-pin 65 strikes the bottom of the main valve 60.

It will thus be seen that I have provided an air separator particularly adaptable for a liquid dispensing system of the type wherein liquid is passed through the liquid flow line by any suitable means, be it by air pressure or by any other liquid forcing means in common use, and wherein this liquid is delivered through the flow line and through the meter under pressure to operate the meter, and to thence flow through the dispensing hose, past the valve-controlled nozzle thereof when the valve is opened. In this type of liquid dispensing apparatus I have inserted my air separator in the flow line in advance of the meter. This air separator includes a constantly open but restricted port which functions to compel the main volume of liquid to pass out the flow line discharge port 64 to the meter, which will at the same time not only permit air constantly to pass through this restricted port 64, but will also permit a relatively smaller stream of liquid constantly to flow through the restricted port 64 during the dispensing operation. Furthermore, I provide this restricted port with a communicating means which permits the air and liquid passing through the restricted port to separate and this means includes a constantly open discharge to the atmosphere for discharging the separated air to atmosphere and the recovery line for returning the constantly flowing restricted stream of liquid to the system, and also includes means for preventing air from the atmosphere reaching the recovery line during the dispensing operation. Thus I have provided a device which will automatically and continuously eliminate air from the system and from the liquid being dispensed before the liquid passes to the meter, thereby obtaining correct measurement of the liquid and elimination of the air takes place continuously during the dispensing operation, the air being discharged directly to atmosphere and the recovered liquid flowing continuously back to the system where it is again passed through the flow line.

Obviously those skilled in the art may make various changes in the details and arrangement of parts without departing from the spirit and scope of the invention as defined by the claims hereto appended and I wish therefore not to be restricted to the precise construction herein disclosed.

This application is a continuation of my application Serial No. 302,195, filed August 27, 1928.

Having thus described my invention, what I claim as new and desire to obtain by Letters Patent is:

1. A dispensing system for liquids comprising a gasoline line and a casing having an inlet and an outlet connected to the gasoline line, with the top of the casing vented to the atmosphere, a float in said casing, a pilot valve, a main valve, said valves controlling the flow of liquid through said outlet, and connections between said float and said valves to cause the pilot valve to open prior to the opening of the main valve.

2. In a dispensing system, the combination with a casing having an inlet port and an outlet port in its lower portion and a vent to the atmosphere in the casing, a main valve for controlling the outlet port, a pilot valve adapted to open prior to the opening of the main valve, and connections between said float and said valves to cause the float to first open the pilot valve and let the liquid pressure be equalized on both sides of the main valve before the latter is opened.

3. In a dispensing system, the combination with an air release casing having an inlet port and an outlet port in its lower part and a vent to the atmosphere in its upper portion, a float in said casing, a main valve for said outlet port, a pilot valve at the center of said main valve for controlling a port through the central portion of said main valve, and connections between said float and said valves to open the pilot valve first and subsequently pick up the main valve and open the same.

4. In a dispensing system, the combination with an air release casing having an inlet port and an outlet port in its lower portion, a main valve for controlling the flow of liquid from said outlet port, a pilot valve for said main valve to facilitate opening of the latter, and a float connected to said valves to first open the pilot valve and then the main valve.

5. In a dispensing system, the combination with an air release casing with an air vent in its upper portion and inlet and outlet ports in its lower portion, a main valve for the outlet port, a pilot valve for the main valve, a float within the casing, and connections between said float and said valves to effect initial lifting of the pilot valve to open a port through the main valve and subsequently lift the main valve to open the outlet port.

6. An apparatus of the class described comprising a supply reservoir, a gas and liquid separator having a constantly open, fixed size, small bore gas discharge port, and a liquid discharge port, means for passing the liquid from the supply reservoir to said gas and liquid separator, a standpipe for separating the liquid from the gas passing through said gas discharge port, said pipe communicating with the latter port and, at its outer end, with the atmosphere, and a liquid recovery chamber communicating with the inner end of said pipe.

7. A dispensing system for liquids comprising a gasoline line and a casing having an inlet and an outlet connected to the gasoline line, with the top of the casing vented to the atmosphere, a float in said casing, a pilot valve, a main valve, and connections between said float and said valves to cause the pilot valve to open prior to the opening of the main valve.

8. In a dispensing system, the combination with a casing having an inlet port and an outlet port in its lower portion and a vent to the atmosphere in the casing, a main valve for controlling the outlet port, a pilot valve adapted to open prior to the opening of the main valve, and connections between said float and said valves to cause the float to first open the pilot valve and let the liquid pressure be equalized on both sides of the main valve before the latter is opened.

9. In a dispensing system, the combination with an air release casing having an inlet port and an outlet port in its lower part and a vent to the atmosphere in its upper portion, a float in said casing, a main valve for said outlet port, a pilot valve at the center of said main valve for controlling a port through the central portion of said main valve, and connections between said float and said valves to open the pilot valve first and subsequently pick up the main valve and open the same.

10. In a dispensing system, the combination with an air release casing having a vent in its top, of a valve for controlling the flow of liquid from said casing, a float in said casing connected to said valve to operate the same, and means for limiting the upward movement of said float to prevent the same from closing said vent.

11. In a dispensing system, the combination with an air release casing having an inlet port and an outlet port in its lower portion, a main valve for controlling the flow of liquid from said outlet port, a pilot valve for said main valve to facilitate opening of the latter, and a float connected to said valves to first open the pilot valve and then the main valve.

12. In a dispensing system, the combination with an air release casing with an air vent in its upper portion and inlet and outlet ports in its lower portion, a main valve for the outlet port, a pilot valve for the main valve, a float within the casing, and connections between said float and said valves to effect initial lifting of the pilot valve to open a port through the main valve and subsequently lift the main valve to open the outlet port.

13. In a dispensing system, the combination with a dispensing unit, of an air release, connections for effecting supply of liquid to said dispensing unit through said air release, a shut-off valve for controlling the flow of liquid from said air release to said dispensing unit, a float in said air release for controlling said shut-off valve, means for venting the air release to the atmosphere, and a connection for directing overflow of liquid from said air release back to the source of supply.

14. Liquid delivery apparatus of the character described comprising a liquid flow system including a liquid supply reservoir, and a liquid flow line leading from said liquid supply reservoir to a dispensing nozzle, a displacement meter in said line, a gas separator in said line in advance of said meter to remove gases from the liquid delivered through the meter, said separator comprising a casing forming a chamber having an inlet port connected to the delivery line, said inlet port being disposed in the lower portions of said casing, a gas-free liquid discharge port connected in the delivery line, said discharge port being located in the lower portions of said casing, a restricted gas discharge port in the upper portions of said casing, a valve for said gas-free discharge port, a float means within the casing for controlling said valve in accordance with the liquid level in said chamber, receiver means associated with said gas discharge port for receiving gas and liquid discharged from the casing through said port, said receiver means serving to separate the gas from the liquid received through said restricted port and having means to vent the gases directly to atmosphere, and having a liquid flow return line back to said liquid flow system.

15. Liquid delivery apparatus of the character described comprising a liquid flow system including a liquid supply reservoir, a liquid flow line leading from said liquid supply reservoir to a dispensing nozzle, a displacement meter in said line, a gas separator in said line in advance of said meter to remove gases from the liquid delivered to the meter, said separator including a casing forming a chamber having an inlet port connected to the delivery line, said inlet port being disposed in the lower portion of the casing, and said casing having a gas-free liquid discharge port located in the lower portion of said casing, said casing having a restricted discharge port in the upper portion of said casing, and a plurality of valves for said gas-free discharge port, one of said valves being smaller than the other of said valves, said plurality of valves having a combined area of such extent that the pressure created within said chamber, due to the restricted discharge port, during dispensing is sufficient to hold said valves normally closed, a float disposed within said chamber and being of insufficient buoyancy to lift said plurality of valves, said float, however, having sufficient buoyancy to raise the smaller of said valves to permit flow therethrough to equalize the pressure on opposite sides of said other valve whereby to raise both of said valves, receiver means associated with said gas discharge port for receiving gas and liquid discharged from the casing through said port, said receiver means serving to separate the gas from the liquid received through said restricted port and said receiver means having means to vent the gases directly to atmosphere, and said receiving means having a liquid flow return line back to the liquid flow system.

16. An apparatus of the class described comprising a liquid flow system including a supply reservoir, a gas and liquid separator having a main separator chamber provided with a main liquid discharge port, a flow line connected to said liquid discharge port, a meter in said line, said meter having a dispensing discharge line, means for forcing liquid under pressure from the supply reservoir to said gas and liquid separator and through said meter and dispensing discharge line, means for controlling the liquid flow through said dispensing discharge line, said gas and liquid separator having also a constantly open but restricted liquid and gas discharge through which gas and a relatively small volume of liquid are continuously flowing during dispensing, and additional gas and liquid separating means connected to said restricted discharge for separating the liquid from the gas passing through said restricted discharge, said additional separating means having communication with the atmosphere, and a liquid recovery conduit communicating with said additional separating means for returning the restricted flow of liquid back to the system.

17. A liquid delivery apparatus of the character described comprising a liquid flow system including a liquid supply reservoir and a liquid flow line leading from said liquid supply reservoir to a dispensing nozzle, a displacement meter in said line, a gas separator in said line in advance of said meter to remove gases from the liquid delivered through the meter, said separator having a main separator chamber having a main liquid discharge port connected to said flow line, means for forcing liquid under pressure from the supply reservoir to said separator and through said meter and through the dispensing nozzle, means for controlling the liquid flow through said dispensing nozzle, said separator chamber also having a constantly opened but restricted liquid and gas discharge through which gas and a relatively small volume of liquid will constantly flow during dispensing, and an additional gas and liquid separating means connected to said restricted discharge of said chamber for separating the liquid from the gas passing through said restricted discharge, said additional separating means having an upstanding pipe communicating with the atmosphere at an elevation above that of the separating chamber and means forming a liquid recovery line communicating with said additional gas and liquid separating means for returning the liquid passing through said restricted discharge back to the system.

18. An apparatus of the class described comprising a liquid flow system including a supply reservoir, a gas and liquid separator having a main separator chamber provided with a main liquid discharge port, a flow line connected to said liquid discharge port, a meter in said line, said meter having a dispensing discharge line, means for forcing liquid under pressure from the supply reservoir to said gas and liquid separator and then through said meter and dispensing discharge line, means for controlling the liquid flow through said dispensing discharge line, said gas and liquid separator having also a constantly open but restricted liquid and gas discharge through which gas and a relatively small volume of liquid are continuously flowing during dispensing, and an additional gas and liquid separating means connected to said restricted discharge comprising a downwardly extending liquid conduit through which the liquid passing through said restricted port is adapted to flow, said downwardly depending conduit having an upstanding pipe having its upper end disposed above the downwardly depending conduit and above the separating chamber and open to atmosphere, said downwardly extending conduit having a liquid receiving return pipe connection with the system.

19. A gas and liquid separator having adjacent its lower end an inlet port for liquid mixed with gas and an outlet port for liquid freed from gas, means between the ports for preventing liquid mixed with gas from having free direct passage to said outlet port, and a constantly open, fixed size, small bore gas and liquid discharge port adjacent the top of the separator, said inlet opening being of relatively very small cross-sectional area as compared to the horizontal cross-sectional area of the separator.

20. A liquid dispensing apparatus of the class described including a supply reservoir, a meter, said meter having a dispensing discharge line, means for passing liquid from the reservoir to the meter and through said dispensing line, a valve controlled nozzle at the end of the discharge line, a gas and liquid separator between the supply reservoir and the meter, said gas and liquid separator having inlet, outlet and vent openings, a vent and stand pipe for further separating any gas and liquid passing through said vent opening, said pipe having its upper end vented to atmosphere and a liquid recovery line communicating with said pipe; said separator being characterized in that the inlet opening is adjacent its bottom, is of relatively very small cross-sectional area as compared to the horizontal cross-sectional area of the separator and is relatively very large as compared with the cross-sectional area of the vent opening, said vent opening being constantly open and of a fixed size and located adjacent the top of the separator.

CLEMENT P. GRIFFITH.